United States Patent [19]
Dipiazza

[11] Patent Number: 6,141,557
[45] Date of Patent: *Oct. 31, 2000

[54] LMDS SYSTEM HAVING CELL-SITE DIVERSITY AND ADAPTABILITY

[75] Inventor: Gerald C. Dipiazza, Boxford, Mass.

[73] Assignee: The Whitaker Corporation, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/866,793

[22] Filed: May 30, 1997

Related U.S. Application Data

[60] Provisional application No. 60/018,724, May 31, 1996.

[51] Int. Cl.$^7$ ...................................................... H04B 7/24
[52] U.S. Cl. ........................... 455/446; 455/447; 455/562
[58] Field of Search .................................... 455/446, 447, 455/422, 562, 522, 504, 506, 63, 67.1

[56] References Cited

U.S. PATENT DOCUMENTS

| | | | |
|---|---|---|---|
| 5,365,571 | 11/1994 | Rha et al. ................................. | 64/997 |
| 5,463,673 | 10/1995 | Herscovici ............................... | 455/446 |
| 5,483,667 | 1/1996 | Faruque .................................... | 455/446 |
| 5,507,034 | 4/1996 | Bodin et al. ............................. | 114/347 |
| 5,519,409 | 5/1996 | Uematsu et al. ........................ | 343/771 |
| 5,537,122 | 7/1996 | Eguchi ..................................... | 342/359 |
| 5,559,866 | 9/1996 | O'Neill .................................... | 455/447 |
| 5,644,791 | 7/1997 | Brady et al. ............................. | 241/982 |
| 5,646,942 | 7/1997 | Oliver et al. ............................. | 370/112 |
| 5,668,610 | 9/1997 | Bossard et al. .......................... | 455/422 |
| 5,809,431 | 9/1998 | Bustamante et al. ................... | 455/562 |
| 5,828,960 | 10/1998 | Tang et al. ............................... | 455/446 |
| 5,828,962 | 10/1998 | Ho-A-Chuck ........................... | 455/446 |
| 5,926,762 | 7/1999 | Arpee et al. ............................. | 455/447 |
| 5,987,328 | 11/1998 | Ephremides et al. ................... | 455/446 |

FOREIGN PATENT DOCUMENTS

| | | | |
|---|---|---|---|
| 0201254 | 11/1986 | European Pat. Off. .......... | H04B 7/24 |
| 0201254 A2 | 11/1986 | European Pat. Off. .......... | H04B 7/24 |
| WO 97/46040 | 12/1997 | WIPO .............................. | H04Q 7/36 |

OTHER PUBLICATIONS

T. Fujii, "Effect of reduction of Mobile Communications Co–channel Interference by Transmission Power Control considering received Signal Level Correlations", Electronics and Communications in Japan, Part 1, vol. 76, No. 9, 1993, pp. 89–103.

C. Rypinski, "Economic design of Interference limited Radiotelephone Systems", XP 002048287, 3rd IEEE Vehicular Technology Conference, Toronto, Canada, May 25–27, 1983, pp. 332–340.

Rypinski C A: "Economic design of interference limited radiotelephone systems" 33$^{rd}$ IEEE Vehicular Technology Conference, Toronto, ONT1, Canada, May 25–27, 1983, pp. 332–340.

Fujii T: "Effect of Reduction of Mobile Communications Co–Channel Interference by Transmission Power Control Considering Received Signal Level Correlations" Electronics & Communications in Japan, Part I—Communications, vol. 76, No. 9, Sep. 1, 1993, pp. 89–103.

*Primary Examiner*—Nguyen Vo
*Assistant Examiner*—Duc Nguyen

[57] ABSTRACT

The present invention relates to a millimeter-wave communication system for one-way and/or two-way video, voice and data services that leverages cell-site diversity, subscriber-unit adaptability and a reflection dominated propagation model. To this end, a variety of omni-directional and directional antenna plans, cell-site structures and adaptive reception/transmission plans are envisioned in the present invention. Cell-site diversity is employed and permits shadowed subscriber units to be serviced from the best choice of the surrounding cell-sites based upon millimeter-wave propagation efficiency and not geometric convenience. Cell-site diversity is used to mitigate the ill-effects of environmental and atmospheric factors. Finally, the present plan reduces the reliance on repeaters by using statistically optimal conditions for cell-site selection with reflection based models rather than line-of-sight models, as relied upon in the prior art.

17 Claims, 5 Drawing Sheets

LMDS SYSTEM HAVING CELL-SITE DIVERSITY AND ADAPTABILITY

This application claims benefit of Provisional Application 60/018,724 filed May 31, 1996.

FIELD OF THE INVENTION

The present invention relates to a millimeter-wave communication system for one-way and/or two-way video, voice and data services that leverages cell-site diversity, subscriber-unit adaptability and a reflection dominated propagation model.

BACKGROUND OF THE INVENTION

Local multi-point distribution services (LMDS) is one way to provide high-bandwidth, interactive services as the preferred wireless platform for enhancing and extending the current global broadband communications infrastructure. LMDS is distinct from other conventional copper cable, optical fiber and low frequency wireless systems in its use of millimeter wave frequencies for wireless distribution and cellular-like layouts for spectrum reuse and spectral efficiency. The major advantages of millimeter wave distribution systems are the inherent broad transmission bandwidths that are achievable and the opportunity to minimize the use and hence, the time and cost of implementing wired infrastructure. For example, 1 GHz of bandwidth centered at 28 GHz, has been allocated by the Federal Communications Commission for a one-way television service in the New York City Metropolitan area. A system in keeping with the teachings of U.S. Pat. No. 4,747,160 to Bossard, has been deployed under this allocation. The system uses essentially omni- directional cell-sites arranged in a center-excited cellular pattern to provide one-way TV service to residential customers throughout the New York City Metropolitan area using carriers centered about 28 GHz. The signals transmitted by the cell-sites are received by high-gain/narrow-beam antenna/receiver units which are normally located just inside or outside of a subscriber's window. The received signals are then down-converted and cabled to a set-top receiver and encryption unit that processes and conveys the video and audio signals to conventional, analog televisions systems. Each cell has a channel assignment and polarization allocation that provides for the mitigation of co-channel and adjacent channel interference making possible frequency reuse, and, therefore improved spectral efficiency within a given coverage area. The center-excited coverage plan by the system disclosed in the Bossard reference is based upon geographically geographically partitioned subscribers/receivers within given cells and assumes that each receiver assigned to a cell is serviced specifically by the one cell-site transmitter and omni-directional antenna, geographically particular to the given cell in which the subscriber is located.

The system as disclosed in the reference to Bossard has shortcomings that limit the number of serviceable subscribers and hence the potential return on infrastructure investment per cell-site. To this end, the system proposed in the '160 reference, assumes essentially (a) line-of-sight propagation to most of the subscribers serviced by a given cell-site. Large area propagation shadows imposed by buildings between subscribers and their designated serving cell-sites are mitigated in the system disclosed in the '160 reference by the use of repeaters and/or roof-mounted receivers that service residences, via a wired building infrastructure. The repeaters are strategically located to enable retransmission to cover the shadowed areas. Unfortunately, a necessary consequence of the line-of-sight presumption is the large number of repeaters that are necessary in the deployment and maintenance of the system in order to provide acceptable service given the complex and changing environmental conditions that are characteristic of a large urban area. That is, the repeaters can be used in order to improve the signal quality of a shadowed subscriber, however at an increased cost. The aggressive use of repeater sites in a one-way broadcast approach, where most cell-sites transmit identical information, is not necessarily compatible with efficient frequency reuse when the information transmitted by cell-sites is not identical, or when two-way transmission systems are utilized.

Finally, atmospheric and environmentally induced fading of carriers intercepted by subscriber receivers, and in the case two-way systems by cell-site receivers impose additional limitations which can adversely affect transmission performance. In the context, fading can occur due to rain attenuation, beam deflections and multipath. The system of the '160 reference does not employ any systematic means to reduce the deleterious effects of fading due to such phenomena. Accordingly, a millimeter wave system is needed which increases the sight subscribers and provides for spectral reuse for both one way and two way communications using an affordable cell-site coverage plan.

SUMMARY OF THE INVENTION

The present invention relates to a millimeter wave wireless communication system which can provide both one-way and/or two-way communication services in a variety of urban and suburban population centers. The present invention envisions communications at millimeter wave carrier frequencies between subscribers and cell-site servers. The servers are connected to a central source and/or network infrastructure by conventional copper, optical fiber and/or wireless links.

The present invention enables variability in system complexity tailored to the maturity of the population center being served. To this end, a variety of omni-directional and directional antenna plans, frequency assignment plans, cell-site structures and adaptive reception/transmission plans are envisioned in the present invention. Cell-site diversity is employed and permits shadowed subscriber units to be service from the best choice of the surrounding cell-sites based upon millimeter-wave propagation efficiency and not geometric convenience. Cell-site diversity is used to mitigate the ill-effects of environmental and atmospheric factors. Finally, the present plan reduces the reliance on repeaters by using statistically optimal conditions for cell-site selection with reflection based models rather than line-of-sight models, as relied upon in the prior art.

It is an object of the invention of the present disclosure to project a coverage plan that can accommodate the requirement for spectral efficiency through channel reuse within a given coverage area by the use of directive antennas to confine the coverage areas for selected channels; frequency segmentation as required at each cell-site; and polarization diversity, as required for selective transmission and reception of vertically and horizontally polarized carriers.

OBJECTS, FEATURES, AND ADVANTAGES OF THE INVENTION

It is an object of the present invention to project the leverages of a millimeter wave, cellular-like coverage plan for delivering high fidelity one-way and/or two-way, analog or digital voice, data and voice video services in heavily populated urban areas.

It is an object of the present invention to provide such high fidelity services to all subscribers in a given urban area including non line-of-sight subscribers as well as line-of-sight subscribers.

It is an object of the present invention to project the use of a one-bounce propagation model that rationalizes the opportunity to reach most of the subscribers within a given urban area without the prolific use of repeaters.

It is a feature of the present invention to rationalize the use of a cell-site diversity algorithm which permits each subscriber unit antenna beam to be pointed such that service can be delivered from any one of the surrounding cell-sites based upon maximizing carrier to noise or carrier to interference plus noise.

It is a further feature of the present invention to project a coverage plan that has the flexibility to provide start-up services based upon center-excited cells, omni directional cell-site transmitters and noise-limited channel utilization and mature services based upon peripherally excited cells, directive antennas and interference-limited channel utilization. Center-excited and corner-excited cellular geometries could be considered special cases of this disclosure.

It is a further feature of the present invention to project a coverage plan that can accommodate the requirement for spectral efficiency through channel reuse within a given coverage area by means of:

directive antennas to confine the coverage areas for selected channels, frequency segmentation at each cell-site, polarization diversity, that is, vertically and horizontally transmitted carriers that can be selectively received and detected, and power control at the subscriber to limit the potential for interference It is an advantage of the present invention to project a cellular-like coverage plan which is not bounded by geometric constraints as in conventional mobile cellular plans, but, instead bounded by propagation constraints specific to each subscriber/cell-site transmission path.

It is further advantage of the present invention to feature the use of real time adaptive reception to mitigate outages caused by certain environmentally and atmospherically induced fading phenomena.

DETAIL DESCRIPTION OF THE INVENTION

The disclosure of the present invention is based upon the assumption that the coverage plan must efficiently accommodate service to non-line-of-sight subscribers without the use of repeaters as the mechanism by which to mitigate shadows due to large high rise structures and other atmospheric influences. Assuming that the majority of potential subscribers within an urban coverage area occupy non-line-of-sight residences, it is clear that a non-line-of-sight system must, in effect, meet both system performance and cost requirements. The servicing of non-line-of-sight subscribers can be addressed by examining the consequences of a propagation model which utilizes one specular or coherent reflection to reach a shadowed subscriber. The disclosure of the present invention does not rely upon repeaters to effect communication to shadowed subscribers, but rather uses a cell-site network which effects the best signal possible to a given subscriber using cell-site diversity.

Figure 2:
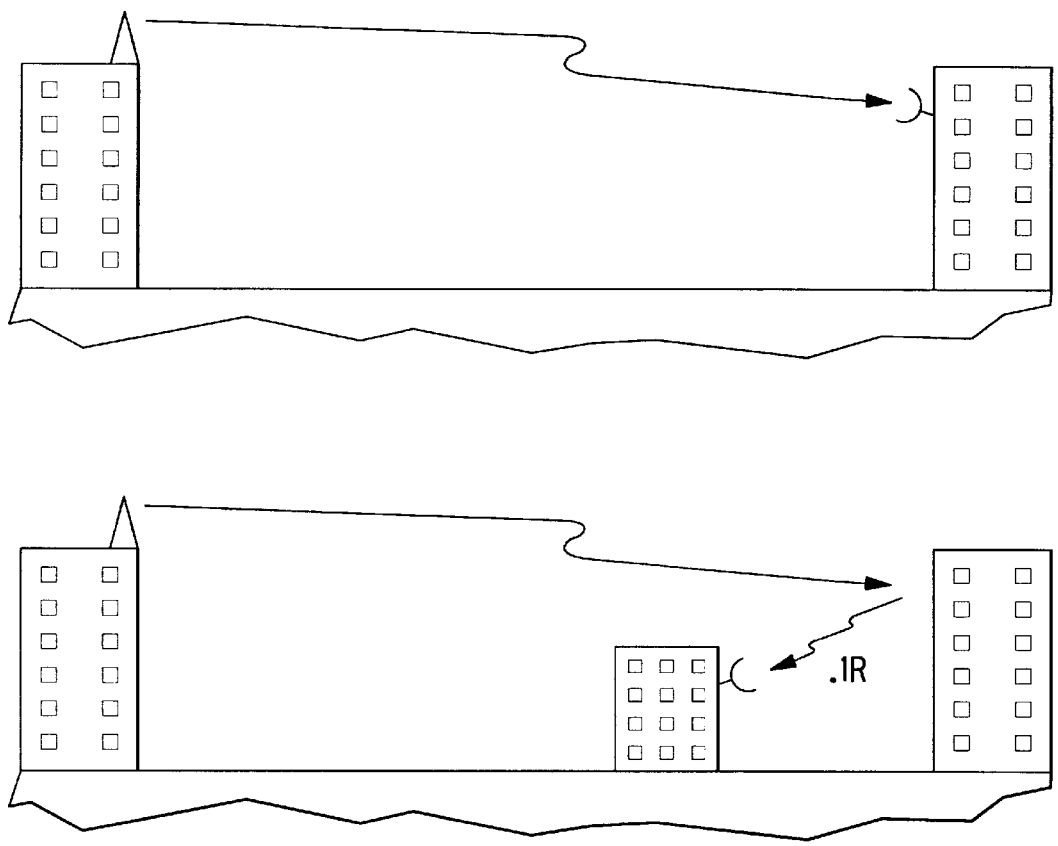
FIG. 2 shows line-of-sight, as well as one bounce specular reception.

The concept of cell-site diversity permits shadowed subscriber units to be serviced by the best choice of the surrounding cell-sites based upon propagation efficiency, not geometric location. Turning to FIG. 2, two basic propagation models for consideration of the present disclosure are shown. Case 1 is free space or line-of-sight reception, the basis for statistical analysis in the present disclosure. For a given set of system implementation parameters and for a given threshold of carrier-to-noise ratio, (CNR), the line-of-sight. (LOS) range of a given cell-site transmitter is given as follows:

$$\frac{(4\pi R_{LOS})^2}{(\lambda)} = \frac{P_t \times G_t \times G_r}{F_r \times k \times T_0 \times B_c \times L_R \times CNR}$$

Where $P_t$ is the power delivered to the transmit antenna; $G_t$ is the transmit antenna gain; $G_r$ is the receive antenna gain; $F_r$ is the noise figure of the receiver; k is Boltzman's constant; $T_0$ is room temperature in Kelvin; $B_c$ is channel bandwidth; $L_R$ is the attenuation due to rain as a function of range; R is the range; and lambda is the free space wavelength. For typical systems, when the carrier-to-noise ratio is on the order of 22 dB, the limit of acceptable line-of-sight range is reached. The non-line-of-sight range, on the other hand, is the line-of-sight range multiplied by a factor $(\rho^2)$ which accounts for a reflection before the signal impinges upon the subscriber antenna. Accordingly, from straight forward analysis, it can be seen that the non-line-of-sight range, $\rho^2 \times R_{LOS}$ is a particular fraction of the line-of-sight range for the same 22 dB where acceptable reception levels are realized.

The range for Case 2 shown in FIG. 2, which assumes one specular reflection is obtained by multiplying the line-of-sight range $R_{LOS}$ by the reflection coefficient $\rho^2$ of the specular reflector and dividing it by $(1.1)^2$. The 1.1 parameter presumes the statistical pathlengths for the specular components are on the order of one-tenth of the free space transmission path length. The magnitude of the reflection coefficient will be a function of the properties of the reflecting material, the thickness of the material and the condition of its surface, as well as the angle of incidents. For ease of calculation, the parameter associated with the reflection in the propagation model is dealt with statistically as having a mean with an associated distribution. If glass is the material primarily responsible for specular reflections, one could rationalize an estimate for a statistical mean as 0.25 with a standard deviation of 0.2 which accounts for variation in the angle of incidents. Metal surfaces would increase the mean reflection when compared to glass; concrete or brick surfaces would, most likely have mean reflections similar to or less than that for glass. If, for example, glass is assumed to be the dominant reflection medium in a dense urban environment, the mean range for a single reflection case is 0.25 $R_{LOS}$, which represents a significant reduction in range. However, if one assumes that cell-site diversity will improve CNR statistics by about 3 dB, as explained later, the difference between the Case 1 line-of-sight and Case 2 one-bounce models is on the order of 2:1 in range. Because the area of a circle is proportioned the square of the radius, the acceptable signal level service area of the non-line of sight model is reduced by a factor of four when compared to the line-of-sight model. The final result, in such a system, requires four times more cell-sites in the "one-bounce" non-line-of-sight scenario than is required in the line-of-sight scenario. This of course, means that four times as many subscribers are needed to support the added infrastructure. This is certainly an achievable number in densely populated urban areas. Of course, an increase in the number of subscribers, through a decrease of in the service area of a cell-area necessitates co-channel and adjacent channel interferences be mitigated by the use of frequency assignment planning, polarization and/or directive antennas at the cell-sites.

The system disclosed herein is neither simply a center-excited plan nor a corner-excited plan. The structure of the present disclosure embraces the flexibility and co-existence of both by permitting a relatively simple noise limited, center-excited omni-directional coverage algorithm for start-up systems as well as an evolution to a mature, interference-limited directional coverage algorithm where cell-site antenna directivity may be required for channel set isolation from cell to cell. The coverage plan proposed in this disclosure is to be viewed as flexible, dynamic and macroscopically adaptive through the use of geometry and propagation statistics in the determination of the cell-site deployment. The system of the present disclosure accommodates various levels of system maturity and capacity, making selective use of both center and peripherally excited cells; both omni-directional and directional cell-site antennas; and the co-existence of various cell sizes within a coverage area.

In deployment of the invention of the present disclosure, it may be necessary to apply adaptive receiver technology to maintain channel reliability for a millimeter wave distribution system, particularly for data and information options. Millimeter wavelengths are susceptible to several environmentally and atmospherically induced forms of fading. To this end, rain is viewed as being one of the most severe forms of millimeter wave degradation, manifested in the form of signal attenuation due to absorption. For heavy precipitation, attenuation levels can be as high as 5 dB per mile. Rain can also be responsible for subtle forms of fading in the sense that the surface of any dominant specular reflector when wet can cause the reflected beam to distort or shift away from the centroid of the subscriber unit antenna pattern. While adaptive attenuation will not mitigate deterioration due to absorptive attenuation alone, it can help to mitigate some of the fading deterioration due to the effects of beam shifting and multi-path issues. Adaptive reception is to include both installer and subscriber to position and orient the antenna at the subscriber's site to effect the best signal-to-interference plus noise ratio.

Finally, fading can occur at the subscriber antenna due to multiple reflections, which are impingent from different reflectors that are within the reception angle of the antenna. The use of very high gain subscriber antennas can selectively eliminate or substantially reduce this form of multi-path fading. If not, adaptive reception can be used to eliminate or substantially reduce multi-path fading. The details of adaptive reception are described herein below.

In principle, the effect of fading at a subscriber's antenna, could be described as a shift in the specular reflected beam and/or a position shift of the local signal strength maximum or both. Microscopic propagation statistics at millimeter wave frequencies do not distinguish among the occurrence probabilities of the various forms of fading. Intuitively, it serves to reason that most of the fading occurrences are likely to be modeled as shifts in the beam centroid of the reflected signal. In some instances of multi-path fading, a position shift of the signal strength maximum is likely to be manifested as well. In either case, it is possible to maintain the maxima of the signal strength through a special front-end antenna combiner, receiver and feedback loop interfaced mechanically with the antenna mount or electrically with a beam steering network to effect a repositioning of the antenna beam and its orientation. Such applications are within the realm of adaptive reception and are similar in nature to direction finding array radar sensors.

Figure 3:
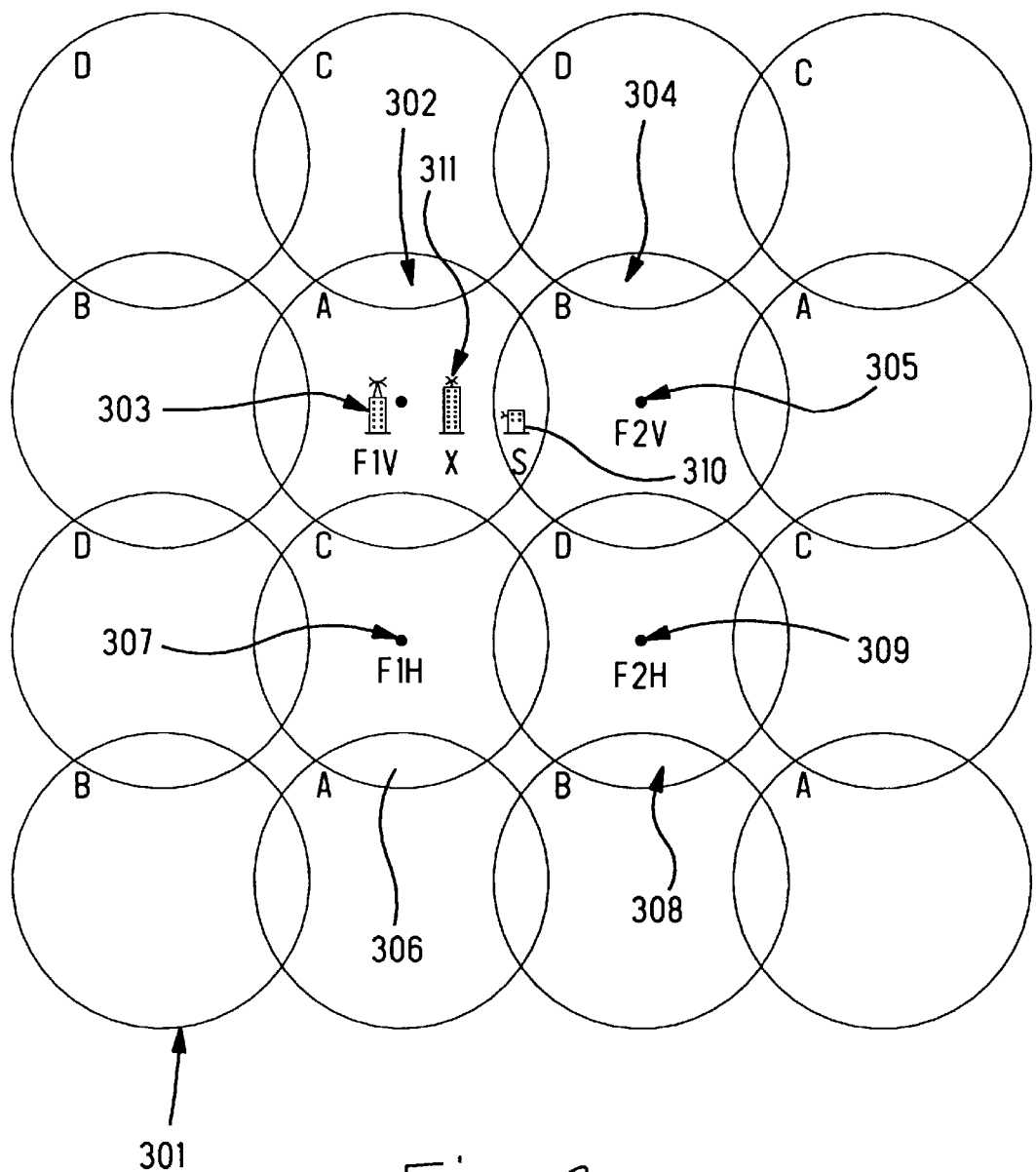
FIG. 3 is a schematic representation of various cell-sites of the present disclosure.

In the first embodiment of the present disclosure, a one-way broadcast system is disclosed where the majority of the reused channels carry identical information. A typical broadcast layout for the one-way broadcast system is as shown in FIG. 3. Center-excited omni-directional cell-sites 301 labeled A, B, C, D for purposes of discussion, are located at roughly twice the expected line-of-sight range of each transmitter. In principle, a one-way broadcast system would require one transmit site for a given service area if enough carrier power should be made available. However, current art in millimeter wave transmitters restricts the range of acceptable mean signal power to a few miles. Accordingly, a network of transmitters must be deployed to service a large area of subscribers requiring, therefore, the reuse of the broadcast channels throughout the coverage area. In the one-way system disclosed herein, reuse of a particular frequency segment is constrained by the interference distortion produced when a given subscriber unit is permitted by layout geometry to receive co-channel and/or adjacent channel carriers from cell-sites which have comparable signal-strength levels. The measure of acceptable distortion is usually given in terms of carrier-to-interface (C/I) ratios at the subscriber's receiver. In a wireless distribution system, co-channel interference at a subscriber's antenna within a given cell-site coverage can be restricted by delineating the distances from serving and potentially interfering cell-sites. That is, the carrier to interference ratio is a function of the distance ratio raised to some power which is usually 2 or more. Usually, as stated previously, acceptable cell radii are distances where the 22 dB carrier/interference level is reached. Accordingly, by repeating a particular frequency at a distance which is great enough, the co-channel interference by frequency reuse is substantially avoided.

Additionally, other techniques can be employed to limit co-channel channel interference. Segmentation of cell-site transmit antennas into directive antennas can be used to confine channels to specific coverage areas. Additionally, orthogonal polarization of co-channel transmission can be used to isolate signals from one another within the same coverage area. For the purposes of example, consider cell-site A(302) which transmits at frequency channel-set F1 using a vertically polarized antenna, designated F1V(303). Cell-site B(304) adjacent cell-site A(302) transmits frequency channel set F2 using a vertically polarized antenna designated F2V(305). Cell-site C(306) transmits frequency channel-set F1 using a horizontally polarized antenna designated F1H(307), while cell-site D(308) transmits frequency channel-set F2 using a horizontally polarized antenna designated F2H(309). Each specific channel within the frequency channel-set F2 is adjacent to two specific channels with a frequency channel-set F1. Consequently, the system of FIG. 4 must accommodate signal strength constraints relating to both co-channel interference and adjacent channel interference. Consider again for the purposes of example subscriber unit S(310) which is within the geographical confines of Cell A, but is shadowed by the Building X(311). While in the prior art, a repeater on the rooftop of Building X(311) would be used, the present invention relies upon statistical probability to determine a surrounding cell-site transmitter B, C or D which can provide subscriber S with an acceptable signal, for example 22 dB as discussed above. Of course, such a system requires a statistically verified propagation study to properly locate the cell-sites throughout the coverage area. Disclosure of the present invention relies upon the one-bounce model, proposed and described above, as a guideline in the layout of a millimeter wave distribution system.

Figure 4A:
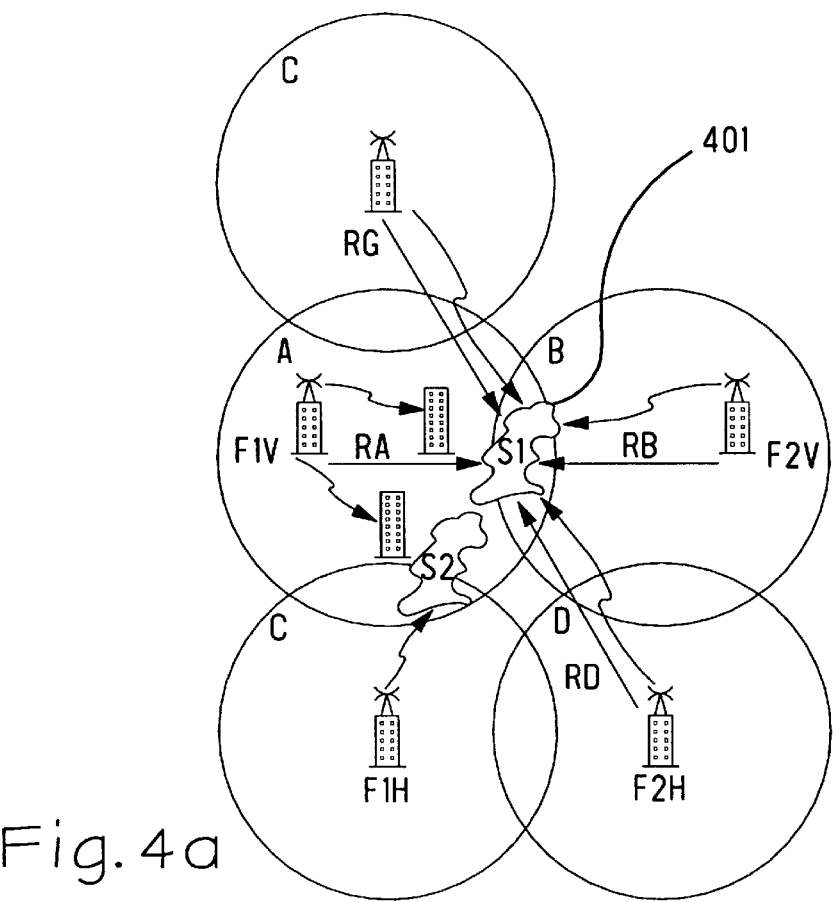
FIG. 4A is an example of the use of cell-site diversity to maximize the signal to a shadowed subscriber.

The one-bounce statistical propagation model of the present disclosure is also known as cell-site diversity. Turning to FIG. 4A, a scenario is shown where significant portions of a given cell are shadowed by man-made structures. By conventional techniques, the subscribers within the areas shadowed from the serving cell-site (for example S1, shown as 401) are serviced by use of one or more repeaters strategically located to deliver acceptable signals within the shadowed zone. Locating, installing and maintaining the number of repeaters necessary to cover a large and evolving urban center is cumbersome and unpredictable. Additionally, the impact of the required number of repeaters on co-channel and adjacent channel interference is deleterious to, if not defeating of the purpose of the repeaters. The disclosure of the present invention allow the subscriber unit to be serviced by any one of the surrounding cell-sites. The choice of cell-site service, which is limited in the prior art to the propagation path geographically supported by a given cell-site, would be extended to multiple cell-sites. Implementation of such a system improves the carrier to noise ratio by as much as 3 or 4 dB.

Figure 4B:
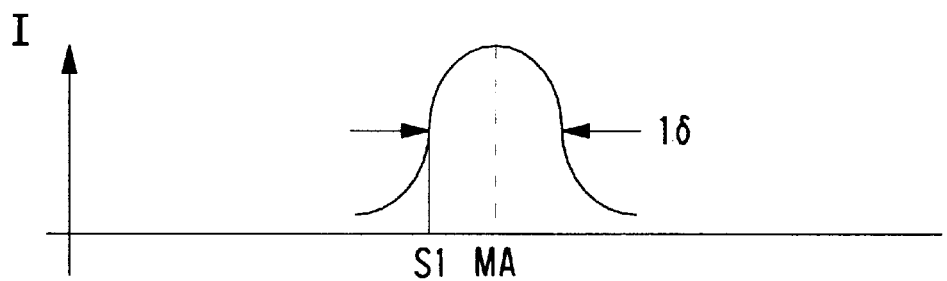
FIG. 4B shows possible examples of the population density versus mean signal strength for various locations about four cells shown in FIG. 4A.
Figure 4B:
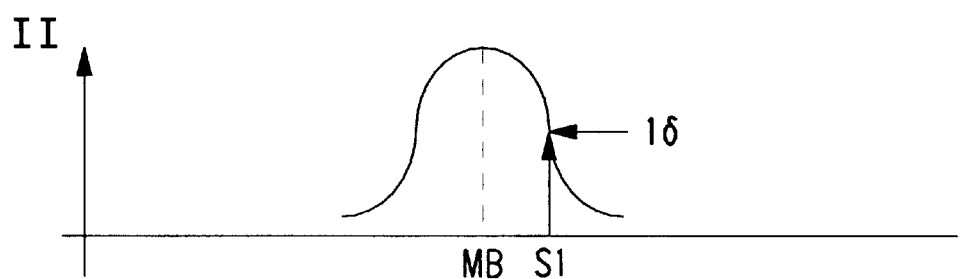
Figure 4B:
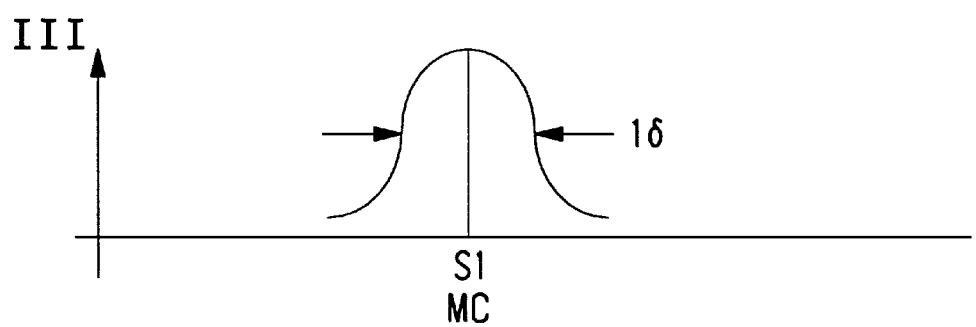
Figure 4B:
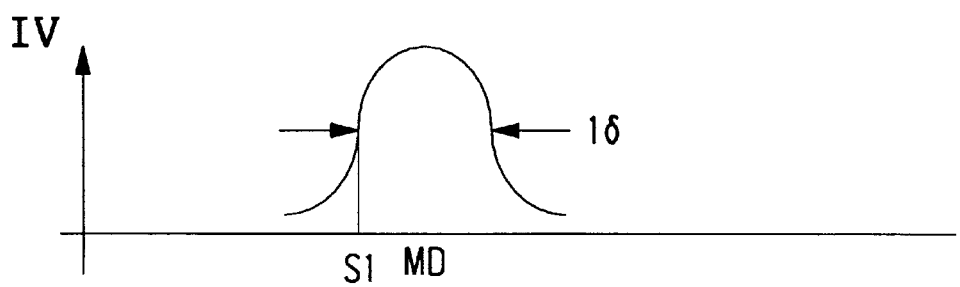

Turning to FIG. 4B, four graphical representations are shown. The graphs are population density versus mean signal strength. Population density is the fraction of occurrences that have a particular value of signal strength at a given radius. Graph I shows the signal distribution for cell-site A(1); graph II for cell-site B; graph III for cell-site C; and graph IV for cell-site D. The signals received are uncorrelated normal signal power distributions from the four cell-sites each at distances which intersect the shadowed area to be served shown in FIG. 4A as S1. Because the one-bounce signal strength statistics are highly likely to be uncorrelated due to the variation in incidence angles at the reflecting surfaces from each of the surrounding cell-sites, the opportunity to choose the best of the four cell-site candidates provides the expected carrier-to-noise ratio improvement. In the particular scenario shown graphically in FIG. 4B, the installer would clearly choose to receive service at S1 from cell-site B which offers the highest signal strength. Another way to view the diversity of choosing the best of any of the surrounding cell-sites is that it statistically increases the radius or $R_{NLOS}$ of each cell-site. Statistical analysis shows that implementation of a system, for example as is shown in FIG. 4A, increases the radius up to 50%, which is effectively the same as increasing the cell size. Thereby, a reduction in required infrastructure is realized.

To accomplish the diversity of cell-site choices, the subscriber unit must be able to detect channels of both frequency sets F1 and F2 in the scenario shown in FIGS. 4A and 4B. In addition to the selective frequency reception, the antenna of the cell-sites must be able to isolate the reception of vertically and horizontally polarized signals, selectively. Practical antenna isolations that have been realized in cellular distribution systems using polarization are on the order of 20 dB to 25 dB. If the adjacent channels are spaced too closely in frequency, or if the isolation achievable with antenna polarization is not great enough, then it is also necessary to use directivity of the antennas at the cell-sites. Again, such additions to the infrastructure may be required as the more mature environmental settings are realized.

Figures 1, 5:
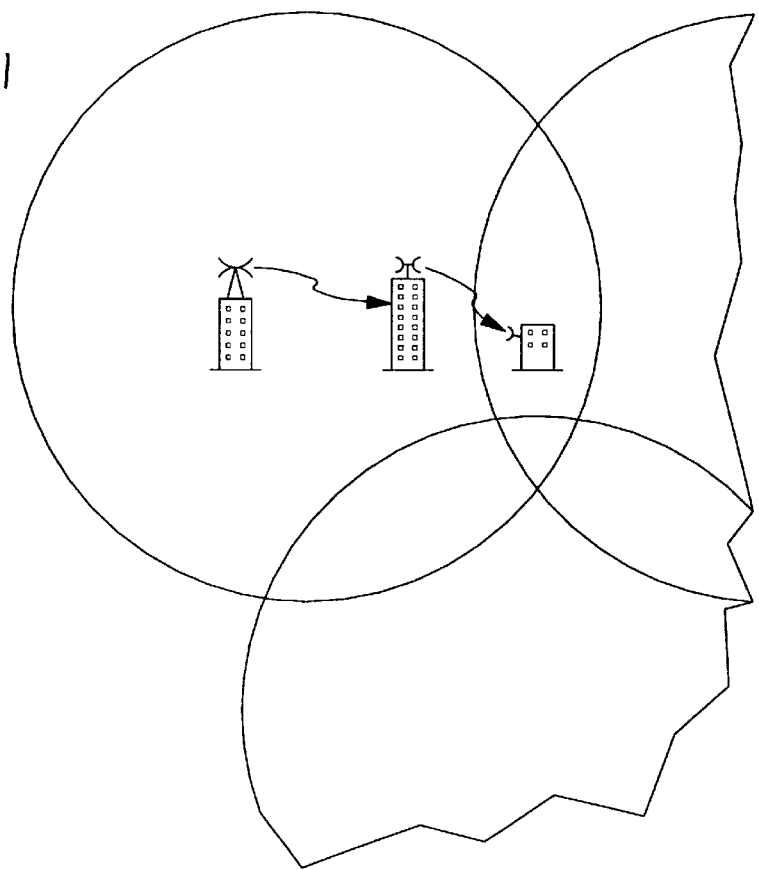
FIG. 1 is a schematic view of a typical cell-site overlap of the prior art, wherein a repeater is used to effect coverage to a shadowed subscriber.
FIG. 5 is a corner-excited system of the present disclosure.

In addition to the system disclosed above, a second embodiment of the present invention utilizes a two-way coverage plan, illustrated in FIG. 5. In the system of the second embodiment, directive cell-site antennas are used to provide coverage selectively to a confined segment of a cellular grid. The choice of the specific cellular coverage plan is usually made on the basis of spectral efficiency or, how many times a given channel-set can be reused within a given service area. The location of cell-site channel sets is determined by the estimated signal strength level of both co-channel and adjacent channel interference intercepted at both the subscriber and cell-site antennas. For two-way millimeter wave distribution systems, the effective isotropic power radiated per unit bandwidth for both cell-sites and subscribers is approximately equal. The fact that very high gain antennas are used for subscriber receivers is significant because such antennas minimize the level of millimeter wave power that must be generated and thus the cost of the subscriber unit. The deployment of cell-sites is therefore tied to the range that the combination of subscriber unit transmit power levels and antenna gains are able to support, and conventionally on the order of several miles. Additionally, on the other hand, some subscribers will be close enough to the serving cell-sites to permit control of the transmit power levels to limit the interference in other cell-site coverage areas. Such a variation of transmit power levels could also be accomplished in an adaptive manner based upon the power level received from the serving cell-site.

As stated above, the reuse of a particular frequency segment is constrained by the interference distortions produced when a given subscriber unit is allowed by layout geometry to receive co-channel or adjacent channel carriers from two or more cell-sites which have similar signal strength levels. The carrier to interference ratio at the subscriber unit, as mentioned above, is the ratio of co-channel cell-site to serving cell-site distances raised to the power of 2, using the model disclosed in FIG. 2 for one-bounce modeling. Such a scenario would suggest that the ratio of distances would have to be in the order of 12:1 to achieve the required C/I of 22 dB. Such a system would not be practical. The system shown in the '160 reference to Bossard, shows that the ratio can be made much more practical using the very high directionality of the subscriber unit antennas to help mitigate the transmission from co-channel cell-sites. However, such a system would work only if the serving and interfering signals are at substantially different angles of arrival. The use of directive antennas at cell-sites to reduce the probability of unacceptable co-channel interference is a valid assumption. From the arguments made in the first embodiment, frequency segmentation, polarization diversity, cell-site diversity, directive gain at the subscriber and directive gain at the cell-sites may be necessary to service a densely configured millimeter wave distribution system, particularly in the two-way scenario of the second embodiment of the present disclosure. The illustration shown in FIG. 5 is an example of how all the many features could be implemented. The grid array for cell-sites shown in FIG. 2 envisions corner-excited cells at frequencies denoted in FIG. 5 as 1, 2, 3 and 4, with the requisite polarization diversity, and directivity as disclosed hereinabove.

Figure 6A:
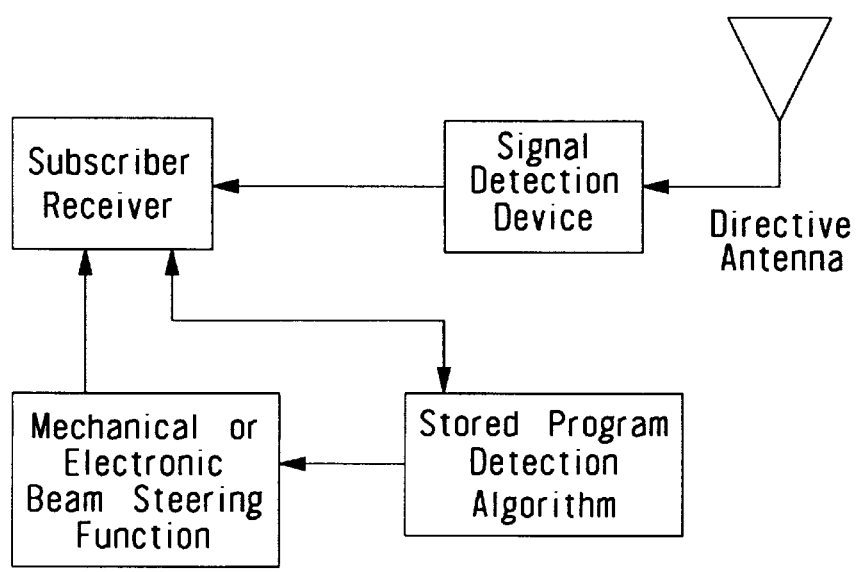
FIG. 6A is a block diagram of an adaptive beam steering receiver.
Figure 6B:
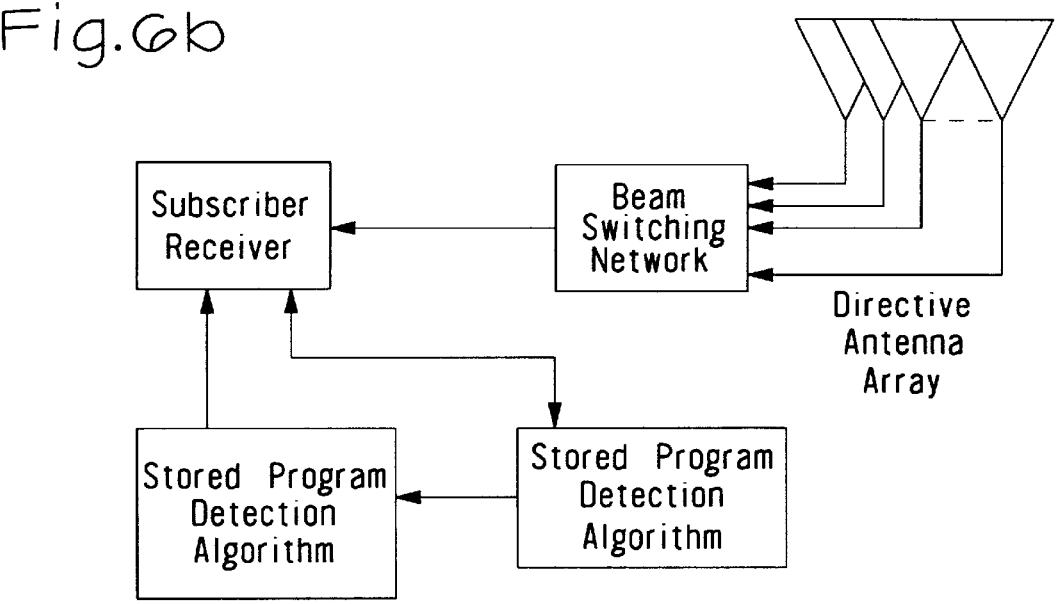
FIG. 6B is a block diagram of an adaptive beam steering and positioning receiver.

In summary, certain types of fading can be mitigated by adaptive reception using radar-like sensing functions that continually update the subscriber antenna beam pointing direction to maintain its focus on the maximum signal strength from a variety of cell-sites as is discussed in combination with FIGS. 4A and 4B. Such systems as are shown in FIGS. 6A and 6B are two of many approaches that can be used to optimize signal strength reception on a continual basis, reducing manual input at the subscriber site either by the subscriber or by the installer. Fades due to multi-path reflection may require a virtual position adjustment in addition to beam pointing adjustment in the subscriber antenna. In this case, the effective antenna aperture may be moved by roughly one-quarter wavelength or approximately 0.1",at the 28 GHz carrier frequency. This is done by implementing two or more overlay patch array apertures spaced in the order of one-quarter wavelength apart on a printed circuit board. The output port of each antenna would then be switched into the receiver, as necessary to maintain an acceptable signal strength.

The invention having been described in detail, it is clear that various modifications of the disclosure of the present invention are within the perview of one of ordinary skill in the art. To the extent that such modifications to reduce the dependents upon geographical location of a particular subscriber, in order to optimize the signal received by the methods described herein, are within the perview of the artist and of ordinary skill having had the benefit of the present disclosure, such are deemed within the scope of the present invention.

I claim:

1. A local point distribution service capable of mitigating the effects of environmental and atmospheric fading, characterized by a plurality of cell-sites having cell-site transmitters, comprising:

a first cell-site having a cell-site transmitter for transmitting a signal of a first frequency, said first cell-site with a first radius having a carrier-to-interference ratio at said first radius of a preselected level which substantially avoids co-channel interference due to frequency reuse, a second cell-site adjacent to said first cell-site, said second cell-site having a cell-site transmitter for transmitting a signal of a second frequency, said second cell-site with a second radius having a carrier-to-interference ratio at said second radius of a preselected level which substantially avoids co-channel interference due to frequency reuse, and a subscriber receiver optionally tuned to receive a signal from one of said first or second cell-site transmitters having the highest signal-to-interference plus noise ratio at said subscriber receiver;

wherein said plurality of cell-sites are positioned at statistically optimal locations using reflection-based models.

2. A local multi-point distribution service, as recited in claim 1, wherein a third cell-site is located adjacent said second cell-site, said third site having a cell-site transmitter for transmitting a signal of a third frequency, said third cell-site having a third radius with a carrier-to-interference plus noise ratio of a preselected level which avoids co-channel interference due to frequency reuse and said subscriber receiver is optionally tuned to receive a signal from a one of said first, second, or third cell-sites having a highest signal to interference plus noise ratio.

3. A local-multi-point distribution service as recited in claim 2, wherein said cell-site transmitters comprise directive antennas.

4. A local-multi-point distribution service as recited in claim 2 using polarization diversity of said signals.

5. A local-multi-point distribution service as recited in claim 2 wherein a fourth cell-site is located adjacent said first cell-site, said fourth cell-site having a cell site transmitter for transmitting a signal of a fourth frequency, said fourth cell-site having a fourth radius with a carrier to interference plus noise ratio at said fourth radius of a preselected level that substantially avoids co-channel interference due to frequency reuse; and a fifth cell located adjacent said first cell, said fifth cell having cell-site a transmitter for transmitting a signal of a fifth frequency, said fifth cell having a fifth radius with a carrier to noise interference ratio at said fifth radius of a preselected level that substantially avoids co-channel interference due to frequency reuse and said subscriber receiver is optionally tuned to receive a signal from a one of said first, second, third, fourth or fifth cell-sites having a highest signal to interference plus noise ratio.

6. A local multi-point distribution system as recited in claim 5, wherein said first, second, third, fourth, and fifth frequencies are different.

7. A local-multi-point distribution service as recited in claim 2 wherein power control at a subscriber site is used to reduce interference.

8. A local multi-point distribution system as recited in claim 7, said subscriber transmitter transmitting a subscriber signal, a power level of said subscriber signal being adjusted for a minimum power level for said subscriber signal to be adequately received by a cell site receiver to which said subscriber receiver is tuned.

9. A local multi-point distribution system as recited in claim 2, wherein said first, second, and third frequencies are different.

10. A local multi-point distribution system as recited in claim 2, wherein said first and third frequencies are substantially the same.

11. A local multi-point distribution service as recited in claim 1, wherein said transmitters are omni-directional.

12. A local multi-point distribution service as recited in claim 1, wherein said subscriber receiver adapted to receive signals further comprises a front-end antenna combiner, receiver and feedback loop interfaced mechanically with an antenna mount to effect repositioning of an antenna.

13. A local multi-point distribution service as recited in claim 1, wherein said subscriber receiver adapted to receive signals further comprises a front-end antenna combiner, receiver and feedback loop interfaced electrically with a beam steering network to effect repositioning of an antenna.

14. A local multi-point distribution system as recited in claim 1, wherein said carrier-to interference ratio is approximately 22 dB.

15. A local multi-point distribution system as recited in claim 1, wherein said first and second frequencies are different.

16. A local multi-point distribution system as recited in claim 1, wherein said first and second frequencies are substantially the same.

17. A local multi-point distribution system as recited in claim 1, wherein one or more of said first, second, third, fourth, and fifth frequencies are substantially the same.

* * * * *